(12) United States Patent  
Selker

(10) Patent No.: US 6,384,810 B1
(45) Date of Patent: May 7, 2002

(54) KEYBOARD WITH BELT CLIP ATTACHMENT AND HEIGHT ADJUSTMENT

(75) Inventor: Edwin Joseph Selker, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,669

(22) Filed: Apr. 9, 1999

(51) Int. Cl.[7] ................................................ G09G 5/00
(52) U.S. Cl. ..................... 345/168; 345/156; 345/169
(58) Field of Search .......................... 345/168, 162, 345/169, 156; 224/257, 625; 108/147; 248/166; 2/114

(56) References Cited

U.S. PATENT DOCUMENTS

| 3,754,284 A | * | 8/1973 | Hartigan et al. ................. 2/114 |
| 4,715,293 A | | 12/1987 | Cobbs .......................... 108/43 |
| 5,207,791 A | | 5/1993 | Scherbart ................. 273/148 B |
| 5,262,762 A | * | 11/1993 | Westover et al. ............ 345/168 |
| 5,263,423 A | | 11/1993 | Anderson ..................... 108/43 |
| 5,421,499 A | | 6/1995 | Bauer .......................... 224/270 |
| 5,667,114 A | | 9/1997 | Bourque ....................... 224/270 |
| 5,675,362 A | | 10/1997 | Clough et al. ............... 345/173 |
| 5,938,096 A | * | 8/1999 | Sauer et al. .................. 224/625 |
| 6,006,970 A | * | 12/1999 | Piatt ............................ 224/257 |
| 6,062,148 A | * | 5/2000 | Hodge et al. ................ 108/147 |
| 6,076,787 A | * | 6/2000 | Troyer ......................... 248/166 |

* cited by examiner

Primary Examiner—Chanh Nguyen
Assistant Examiner—Fritz Alphonse
(74) Attorney, Agent, or Firm—Lacasse & Associates; Randy W. Lacasse; Marc D. McSwain, Esq.

(57) ABSTRACT

A keyboard or keypad or other electronic assembly is adjustably suspended from an individual at waist-level and extends to a position which is comfortable and ergonomic for operation by a standing operator. Height adjustment of the keyboard assembly is provided by a band of semi-stiff material which attaches at one end to an individual's belt and attaches at the other end to a rotatable take-up roller located within the keyboard assembly; and two fold-out legs with a flexible strap stretched between them create a thigh stand-off assembly to angle the input device for better viewing during use. Extension and retraction of the band from the take-up roller, by manual operation, allows varying the height of the keyboard assembly according to to each individual's bodily requirements.

36 Claims, 6 Drawing Sheets

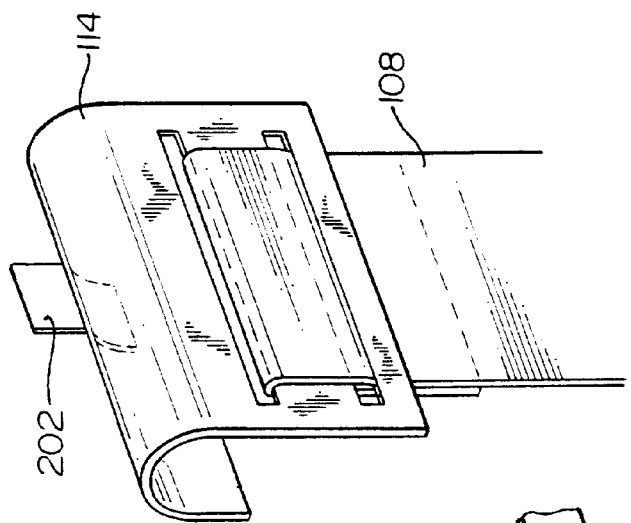
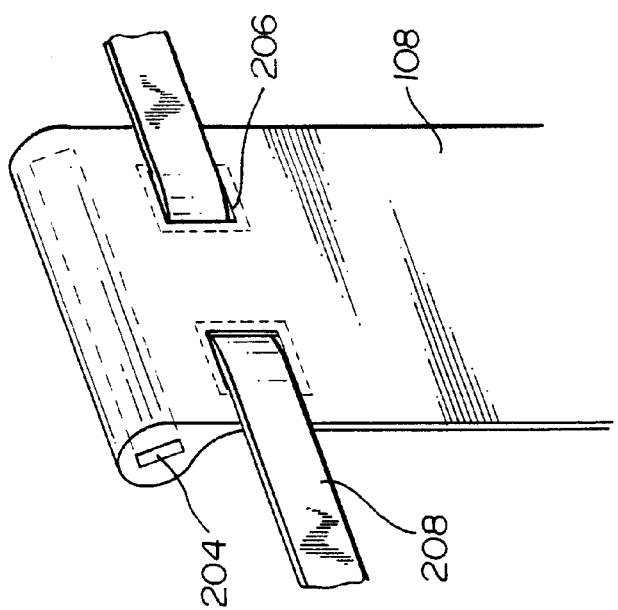
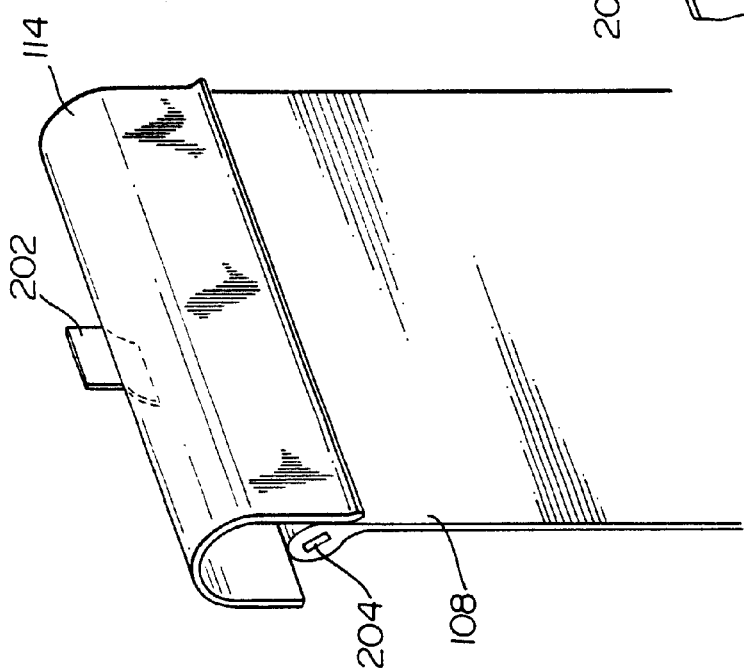
FIG. 2c
FIG. 2b
FIG. 2a

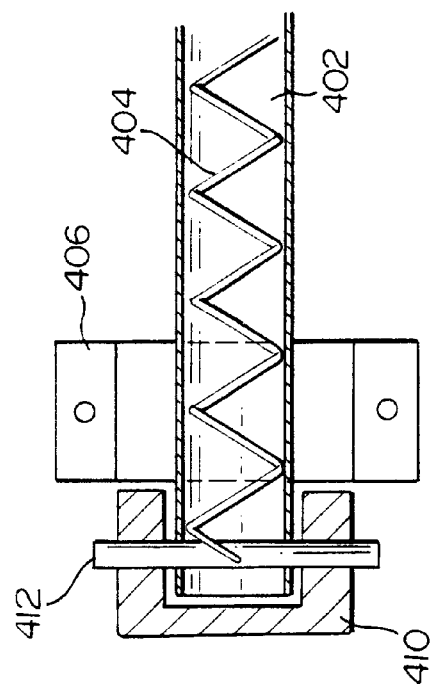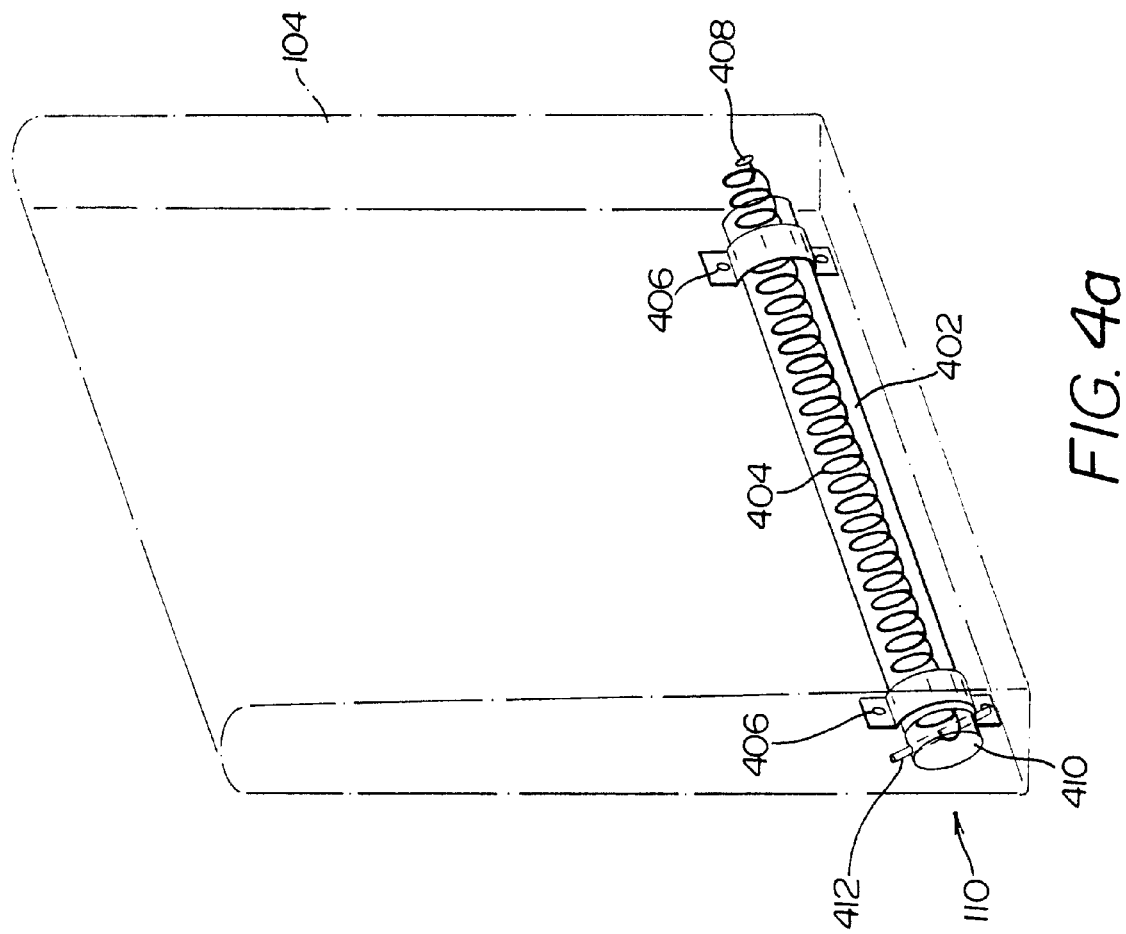

KEYBOARD WITH BELT CLIP ATTACHMENT AND HEIGHT ADJUSTMENT

BACKGROUND OF THE INVENTION

1. Field of Invention

The present invention relates generally to the field of wearable electronic equipment. More specifically, the present invention is related to an adjustment mechanism for a computer-type device secured to a person's body or garments. The device of this invention has particular application in providing a height adjustable, keyboard-like component which is maintained at an ergonomic and comfortable position for use by a standing operator.

2. Discussion of Prior Art

Supporting a computer or keyboard for use by a standing operator is generally known in the art in various configurations as illustrated by U.S. Pat. Nos.: 4,715,293; 5,207,791; 5,421,499; 5,675,362; 5,667,114. Typically, an over-the-shoulder or around-the-neck strap attaches to a horizontal table assembly which supports the keyboard at approximately waist level. The patent to Scherbarth, U.S. Pat. No. 5,207,791, differs somewhat in that it contemplates a multi-jointed support assembly which attaches to a belt around a user's waist. However, such devices, as described in the prior art, have at least three shortcomings: (1) they require numerous adjustments to fit the shoulders, chest, neck and torso measurements of variously sized users, (2) they locate the keyboard in front of the operator which may be socially or culturally awkward, and (3) they require an operator to have an uncomfortable almost 90 degree elbow-bend when utilizing the support assembly.

Whatever the precise merits, features and advantages of the above cited references, none of them achieve or fulfill the purposes of the present invention. Accordingly, it is an object of the present invention to provide for a device with a keyboard which adjusts in height to allow comfortable use by a standing user.

It is another object of the present invention to provide a height adjustable device with a keyboard which allows infinite, or continuous, adjustments of the keyboard height.

It is another object of the present invention to provide a height adjustable device with a keyboard which requires only simple adjustments to easily and quickly accommodate variously sized individuals.

It is another object of the present invention to provide a height adjustable device with a keyboard which is not hindered by various jackets, coats, sweaters and other clothes a user may wear and does not harm similar-type clothing.

It is an additional object of the present invention to provide a height adjustable device with a keyboard which allows the device to be located unobtrusively at either side of the operator.

It is an additional object of the present invention to provide a height adjustable device with a keyboard which provides side-to-side support to prevent twisting and turning of the keyboard surface.

It is an additional object of the present invention to provide a height adjustable device with a keyboard which maintains the keyboard surface at a position which does not fatigue a standing user's arms, hands or wrists.

These and other objects are achieved by the detailed description that follows.

SUMMARY OF THE INVENTION

An assembly including an electronic device with a keyboard, or other similar input apparatus, incorporates within it an elongated strap of semi-flexible material which attaches near standing operator's waist at one end and extends to a selected length thereby holding the electronic device at about mid-thigh height. The strap attaches at one of its ends to a sturdy belt clip, or incorporates a belt accommodating loops at a first end, to facilitate easy attachment of the device to a person's belt, garment, or waistband. Further, the strap of semi-flexible material enters the housing of the electronic device and attaches at its distal end to a take-up roller rotatably fixed within the housing. By changing the amount the strap is wrapped around the take-up roller, an operator can manually adjust the height of the keyboard surface by retracting or extending the strap accordingly. The mechanism by which the strap wraps or unwraps around the take-up roller resembles a typical window-shade arrangement and provides simple and quick height adjustment means to accommodate variously sized operators regardless of their physical size or the bulkiness or delicateness of their clothes. This simple adjustment mechanism provides continuous height adjustability which allows the electronic device to assume an infinite number of positions.

An operator wishing to lower the computer device simply pulls down on the computer device to unwrap some of the strap material from the take-up roller and therefore extend the exposed length of the flexible strap. A height adjusted computer device maintains the desired height because the weight of the computer device and the friction present where the strap enters the housing both act on the strap to prevent the counter-biased take-up roller from rotating. When wanting to raise the computer device, the user simply lifts the computer device so that the strap material automatically wraps around the take-up roller which is spring biased to accomplish retraction of the strap.

The electronic device is easily positioned at a height which allows a standing user to place their hands on the keyboard, or other input mechanism, while their arms are in a relaxed and comfortable position. With no, or only minor, bending of the elbows, a user can comfortably use the keyboard for an extended period of time without fatigue or awkwardness. Fatigue is further lessened by the positioning of the electronic device at the side of the user where their arms and hands normally hang.

Additionally, fold-out support legs, with a flexible strap stretching between them, are attached to the underside of the electronic device housing which are used to brace the housing against a user's thigh in order to tilt the keyboard surface, or input apparatus, to an even more comfortable position depending on the user's preferences and to prevent twisting or turning of the keyboard surface during use.

BRIEF DESCRIPTION OF THE DRAWINGS

FIGS. 2a–2c illustrate alternative embodiments of attaching the present invention to a user's belt.

FIGS. 4a and 4b illustrate the take-up roller of the present invention.

DESCRIPTION OF THE PREFERRED EMBODIMENTS

Figure 1:
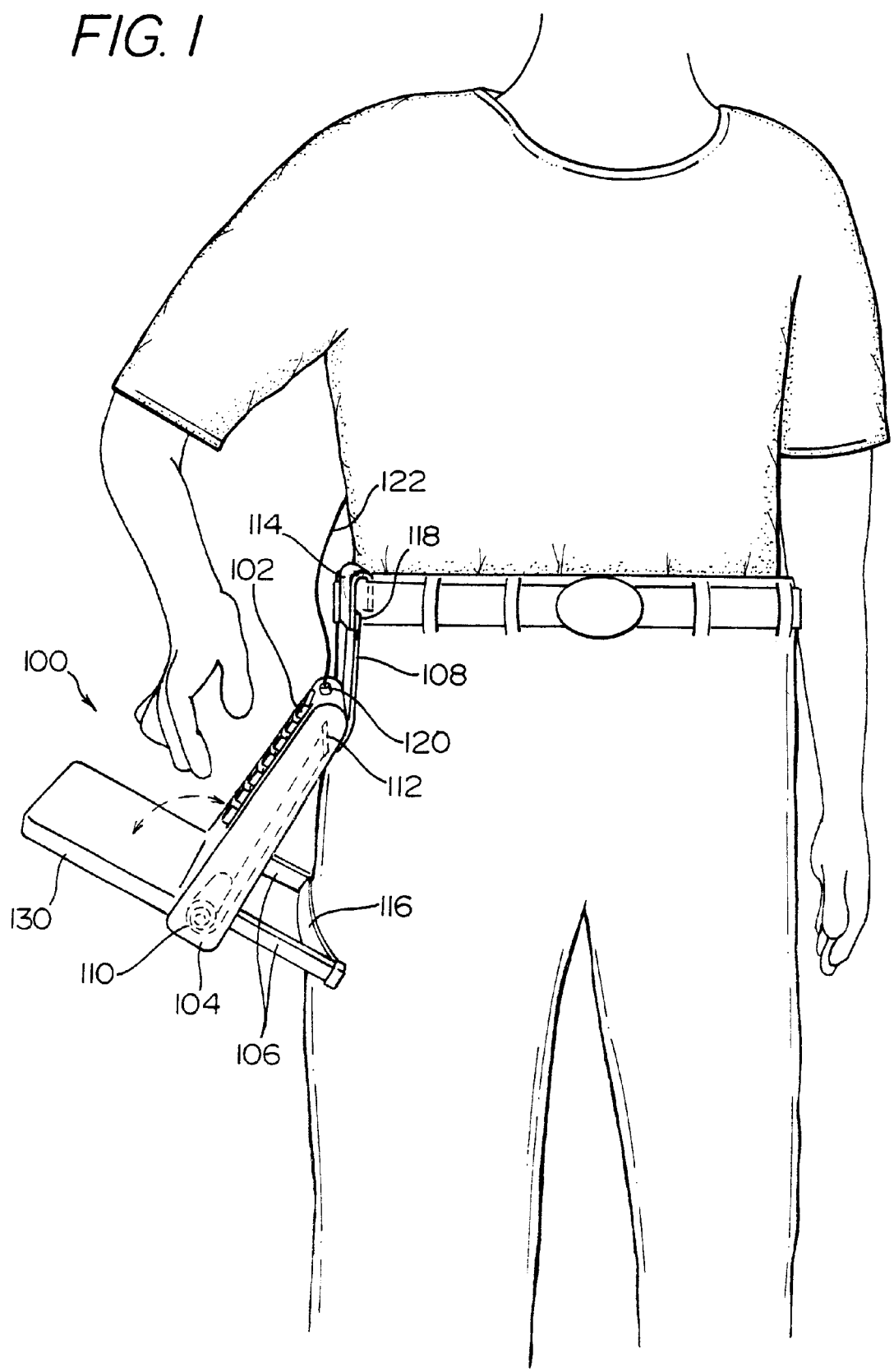
FIG. 1 illustrates a side view of the general components of the wearable electronic device of the present invention in a thigh high position.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

The primary structure of the present invention, wearable electronic device 100, is illustrated in FIG. 1 along with a preferred embodiment "guitar" height. While the electronic device 100 is shown at the user's side, it can be positioned directly in front as well or other suitable positions relative to a user's body during use. Belt clip 114, which preferably is constructed of a polycarbonate material or equivalent strong lightweight material, is shaped to securely slide over a person's belt and is approximately as wide as the normal distance between two belt loops. Clip 114 can also be constructed of functionally equivalent alternative materials which are flexible enough to easily attach and detach to a person's belt yet sturdy enough to support the weight of electronic device 100.

Strap 108 attaches at one end 118 to belt clip 114. A number of known bonding or attachment methods can be used to securely adhere strap 108, preferably constructed of a polymer, Tyvek® or other equivalent strong lightweight flexible material, to polycarbonate belt clip 114. The preferred method of affixing strap 108, however, is around a buckle using contact adhesive to bond it back on itself as illustrated in FIG. 2c. Tyvek® strap 108 is approximately 5 to 6 inches wide and 0.020 inches thick. These dimensions allow strap 108 to be flexible and rolled-up but provide it enough rigidity to resist buckling, twisting and wrinkling. Other equivalent materials include, but are not limited to, fabric doped with acrylic, buckram, and non-memory prone plastics, with or without circuitry printed on them. Strap 108 is long enough to enter device housing 104 at opening 112, extend within housing 104 and wrap around take-up roller 110. A wide range of useful heights for electronic device housing 104 are thus attained if strap length is approximately 16 to 24 inches. However, other useful lengths are envisioned and considered within the scope of the invention.

In FIG. 1, housing 104 is illustrated at its preferred position—"guitar" height. This height is approximately mid-thigh on a standing user and is where a person's hands tend to fall when their arms are allowed to relax and loosely hang at their sides. A slight elbow bend may be present; however, this position causes little fatigue and can be maintained for an extended period of time with little effort.

Electronic device housing 104 is shown in its preferred embodiment as a keyboard input device 102 in FIG. 1. Also, housing 104 is shown with an angle adjustable fold-out display 130. Housing 104, however, can be a wide range of equipment, with or without an attached display, and powered either by battery or external sources. In addition to keyboards, touch pads, stylus input apparatus, trackballs, musical instruments, other control surfaces, and combinations thereof are envisioned. Also, housing 104 can vary, as well, in its processing complexity; the use of simple input devices as well as full processor-based systems are contemplated by the present invention.

Figure 3B:
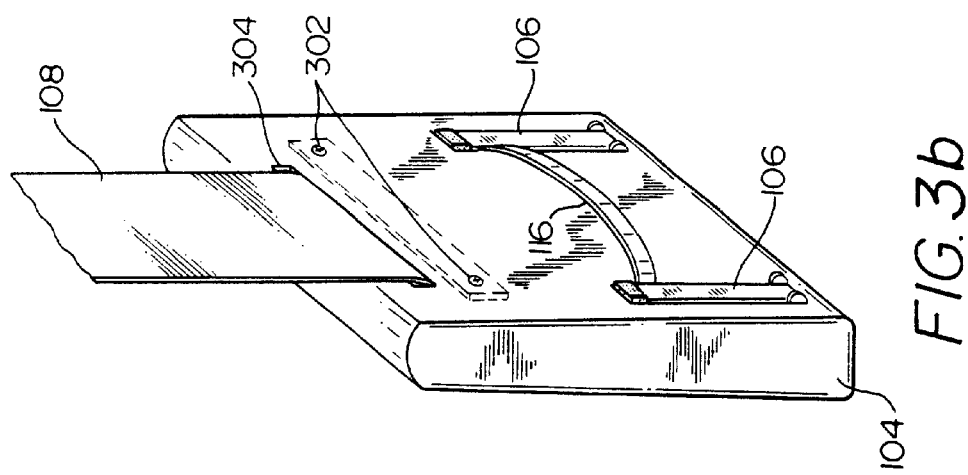
FIGS. 3a and 3b illustrate details of how a flexible strap of the present invention enters a housing body and engages tension plates and a take-up roller.
Figure 3A:
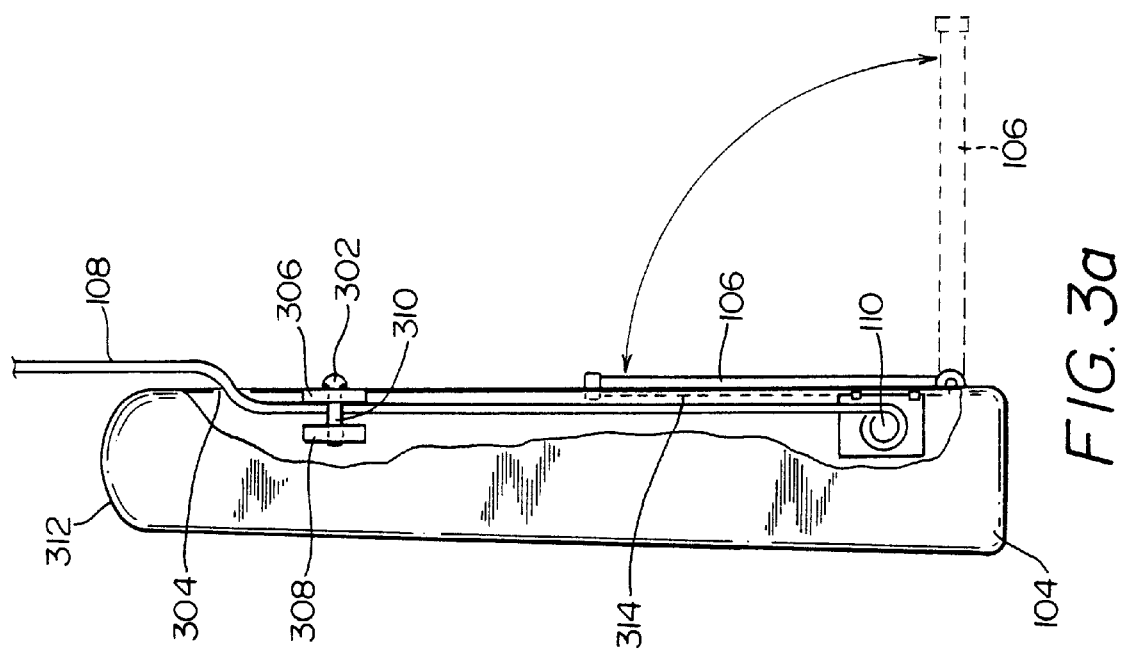

To further position housing 104, fold-out legs 106 extend from hinges (not shown) attached to housing 104 and are connected to flexible strap 116 at their distal ends. In FIG. 1, legs 106 are shown in their extended position where they form approximately right angles to the underside of housing 104. Strap 116 stretches between the distal ends of legs 106. Furthermore, flexible strap 116 matches the contour of the user's thigh to provide an easy and comfortable fit for a variety of users. Any number of materials can be used for flexible strap 116 including strong natural fabrics or elastic synthetics. The length of strap 116 varies depending on the dimensions of housing 104; however, the width and thickness of strap 116 are preferably minimal to allow legs 106 to be as unobtrusive as possible when not in use and folded in close to housing 104. Preferred embodiment dimensions are approximately 0.25 to 0.50 inches wide and 0.0625 to 0.125 inches thick for flexible strap 116. The overall effect of strap 116 and legs 106 is to slightly tilt keyboard 102 from a vertical plane towards a horizontal plane which presents keyboard 102 in a position that a number of people find more comfortable than a straight vertical position. The length of legs 106 in relation to the length of housing 104 and the length of strap 116 control exactly what angle of tilt is attained. Preferably, an angle of approximately 15 degrees provides viewability of the control surface. FIGS. 3a and 3b illustrate legs 106 in their retracted position, recess 314 in housing 104 accepts support legs 106 when they are in this retracted position.

As described, legs 106 have two positions—extended or not extended. As a result, keyboard 102 is either tilted or vertical. An alternative is to have legs 106 hinged with continual tension so that they support housing 104 at any angle between 0 and 90 degrees. Alternatively, legs 106 are hinged to have discrete operating positions and support housing 104 at a variety of engagable angles.

Optional interface jack 120 and cable 122 are also illustrated in FIG. 1. The placement and type of jack 120 is not critical nor is he capability of cable 122. Jack 120 is used to electrically connect to power or input/output signals within housing 104 and is connected to external devices (not shown) through cable 122 which is sufficient to carry any desired signals.

FIG. 2 provides detailed illustrations of two embodiments of the top end of strap 108 which attaches to a person's belt. In the preferred embodiment, strap 108, which extends the entire width of clip 114, is strengthened at its attachment end with batten 204. Batten 204 is constructed of stiff, sturdy plastic and helps prevent twisting and bunching of strap 108. As earlier described, strap 108 is attached to polycarbonate clip 114 the way a strap is affixed to a buckle. Tab 202 extends above clip and into the side of clip 114 opposite strap 108. A user presses on tab 202 to flex clip 114 so that it is easier to slide on or off a person's belt.

An alternative embodiment uses openings 206 to thread strap 108 to person's belt 208. Batten 204 is present in this embodiment as well to prevent bunching and wrinkling of strap 108. Openings 206 are located around 0.5 to 0.75 inches from the closest edge of strap 108 and are double-stitched or otherwise reinforced to provide durability. One variation to this embodiment is to extend batten 204 in width so that it extends from the top of strap 108 to below openings 206. Batten 204 would then have its own openings aligning with strap openings 206 and provide reinforcement to both strap 108 and openings 206.

FIG. 3a provides details regarding how strap 108 enters housing 104 and travels to take-up roller 110. Electronic device housing 104 has opening 304 along the width of its underside which allows strap 108 to enter. Preferably, opening 304 is located in the top half of housing 104 underside as illustrated in FIGS. 3a and 3b; however, other locations, such as in housing 104 top side 312 are also contemplated. Upon entering housing 104, strap 108 passes through tensioner plates 306 and 308 which sandwich strap 108 applying friction thereto and are adjustable by two screws 302 which pass through both tensioner plates 306 and 308 and extend outside housing 104. Thumbscrews or similar hand-engagable ends of screws 302 alleviate the requirement to have special tools to adjust tensioner plates 306 and 308. Tightening of screws 302 reduces the distance between tension plates 306 and 308, thereby increasing friction, and loosening of screws 302 widens the distance between tensioner plates 306 and 308, thereby decreasing friction. Tension plate 306 is attached to side of housing 104 below opening 304; it is constructed of rigid plastic or rubber and has a non-smooth surface which provides friction against strap 108. Tension plate 308 is of similar construction but attaches by way of two screws or bolts 302 to tension plate 306. The purpose of tension plates 306 and 308 is to provide enough friction to prevent strap 108 from freely retracting around take-up roller 110 which would cause housing 104 to travel upwards towards a user's waist. A user who wishes to position housing 104 down their thigh grasps housing 104 and pulls downward. This causes strap 108 to unwrap from take-up roller 110, pass through tension plates 306 and 308 and exit housing 104 through opening 304. Take-up roller 110 is biased to retract strap 108 and would thus return the housing up a person's thigh if not for the combination of the weight of housing 104 and the tension and friction from strap 108 passing though opening 304 and tension plates 306 and 308. A user wishing to return housing 104 to a position up their thigh grasps housing 104 and slightly lifts, doing so breaks the balance of forces that allowed housing 104 to remain stationary and allows take-up roller 110 to retract strap 108.

A detailed illustration of take-up roller 110 is provided in FIGS. 4a and 4b. Hollow tube 402 extends the width of housing 104 and is secured by bearings 406, either metal or plastic, to the underside of housing 104. Tube 402 is approximately 6 to 10 mm in diameter and constructed of T60 or T61 aluminum, or alternatively of steel, bronze or brass. Inside hollow tube 402 is torsion spring 404 which is preferably metal but functionally equivalent rubber or elastic materials are considered interchangeable. Spring 404 is securely fixed to housing 104 and point 408, extends through the entire length of hollow tube 402 and attaches to pin 412 at the opposite end of tube 402. This arrangement allows torsion spring 404 to store energy when strap 108 is unwrapped from take-up roller 110 and release energy to cause retraction of strap 108 around take-up roller 110. The tension of spring 404 also biases tube 402 towards point 408 and creates the need for cap arrangement 410. Cap 410 fits over tube 402 and is too large to pass through the opening of bearing 406. Cap 410, made from material similar to tube 402, is attached to tube 402 using pin 412 and allows take-up roller assembly 110 to freely rotate but overcomes its tendency to travel off-center. Bonding of Tyvek® strap 108 to hollow tube 402 is not shown in detail but is preferably accomplished using appropriate adhesive materials or other known attachment methods. Other alternative embodiments include having a slit in tube 402 which allows strap 108 to enter tube 402 and contact electrical fingers or similar devices within tube 402 and a flexible strap/circuit board.

The preferred embodiment of using a torsion spring to provide the retractive force on strap 108 is not the only method of providing an adjustment mechanism for strap 108. Similar functionality can be attained from a ratchet and pawl mechanism at the edge of tube 402 such as used in a window shade. However, manufacturing tolerances and the increase in moving parts must be considered to provide a high quality fully functional device.

Alternative embodiments of the present invention include an interface with an external processor. Other applications are possible if signals created or stored in electronic device 104 are provided to external devices. Various methods of communication are envisioned which include radio frequency transmission circuits, infrared links, passive resonant circuits and even surface traveling electric fields which create a personal area network. As described earlier in conjunction with FIG. 1, cabling from an external jack to peripheral devices is the preferred embodiment. Power and other signals are provided to electronic device housing 104 and keyboard and other input signals are provided from housing 104 to outside devices. While this is the preferred embodiment, an alternative embodiment is described below.

Figure 5B:
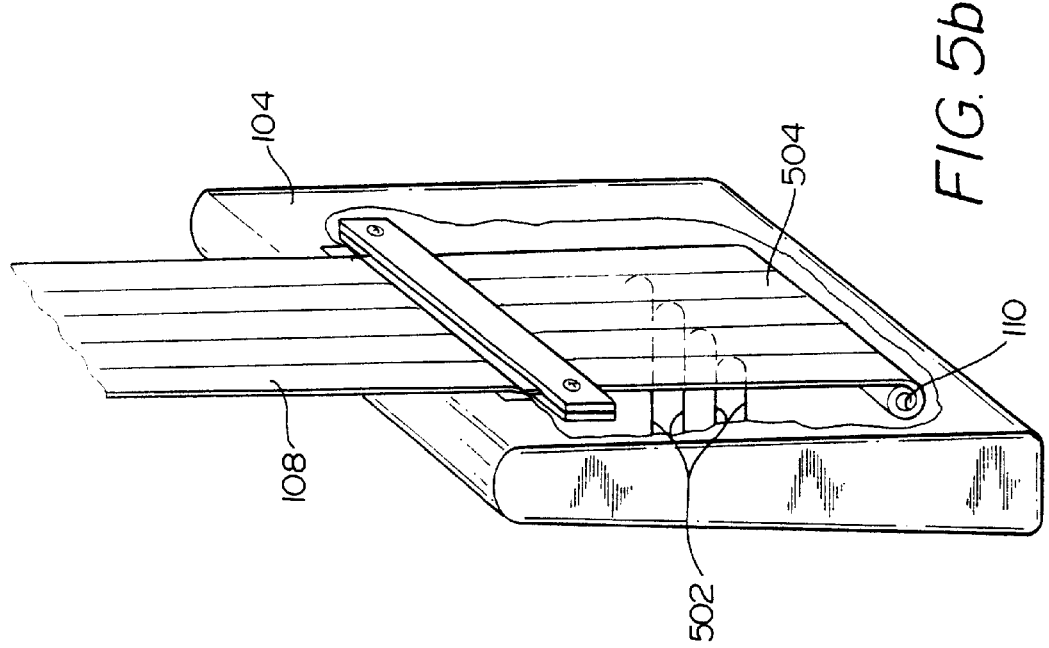
FIGS. 5a & 5b illustrate an alternative embodiments of the present invention wherein electrical conductors are embedded within a flexible strap which supports an electronic device and carries interface signals between the device and other, external devices.
Figure 5A:
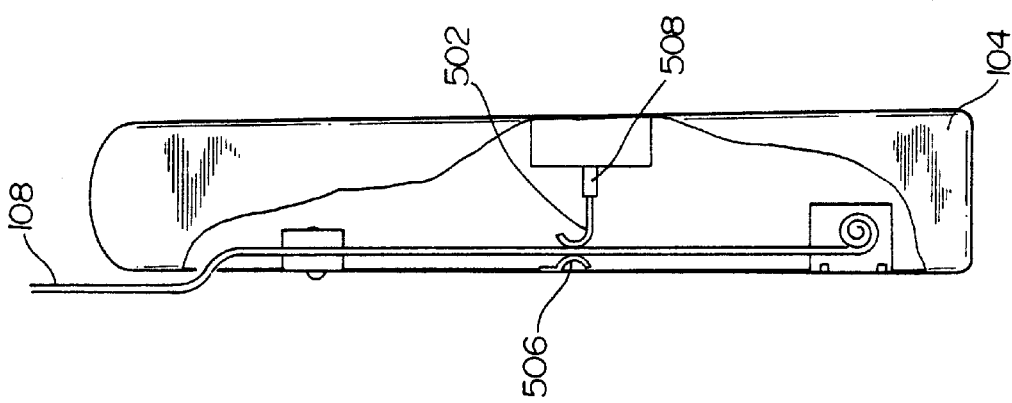

FIGS. 5a and 5b illustrate a method of carrying electrical signals to and from electronic device housing 104 without the need for external cable 122 as shown in FIG. 1. In this embodiment, conductors 504 are embedded or sewn into strap 108. Flexible conductors are known in the art which are able to reliably withstand repeated rolling and unrolling from take-up roller 110. A portion of conductors 504 are at the surface of strap 108 in order to provide electrical contact with fingers 502, which are constructed of a conducting material. Fingers 502 are extensions from circuit board 508 or similar connector which interfaces with the control circuitry and input circuits of electronic device housing 104. FIG. 5b illustrates the preferred arrangement where support 506 forces strap 108 against fingers 502 so that electrical contact with conductors 504 is maintained.

Other methods of putting signals on, and pulling signals off, conductors 504 are also contemplated. Conductors 504 can be on both sides of strap 108 which would then require contact brushes similar to fingers 502 on both sides of strap 108. In an alternative embodiment, conductors 504 in strap 108 are connected to electrical pads on the inner, or outer, surface of take-up roller 110 which are brought out to an edge to contact appropriately arranged brushes. This configuration is similar to how a twist preventing telephone cord adapter works. The interface between belt clip 114 and conductors 504 is not illustrated, as any arrangement of electrical connectors which accept flexible circuit boards is contemplated for acquiring the signals from conductors 504 and making them available to external processors or equipment.

Figure 6:
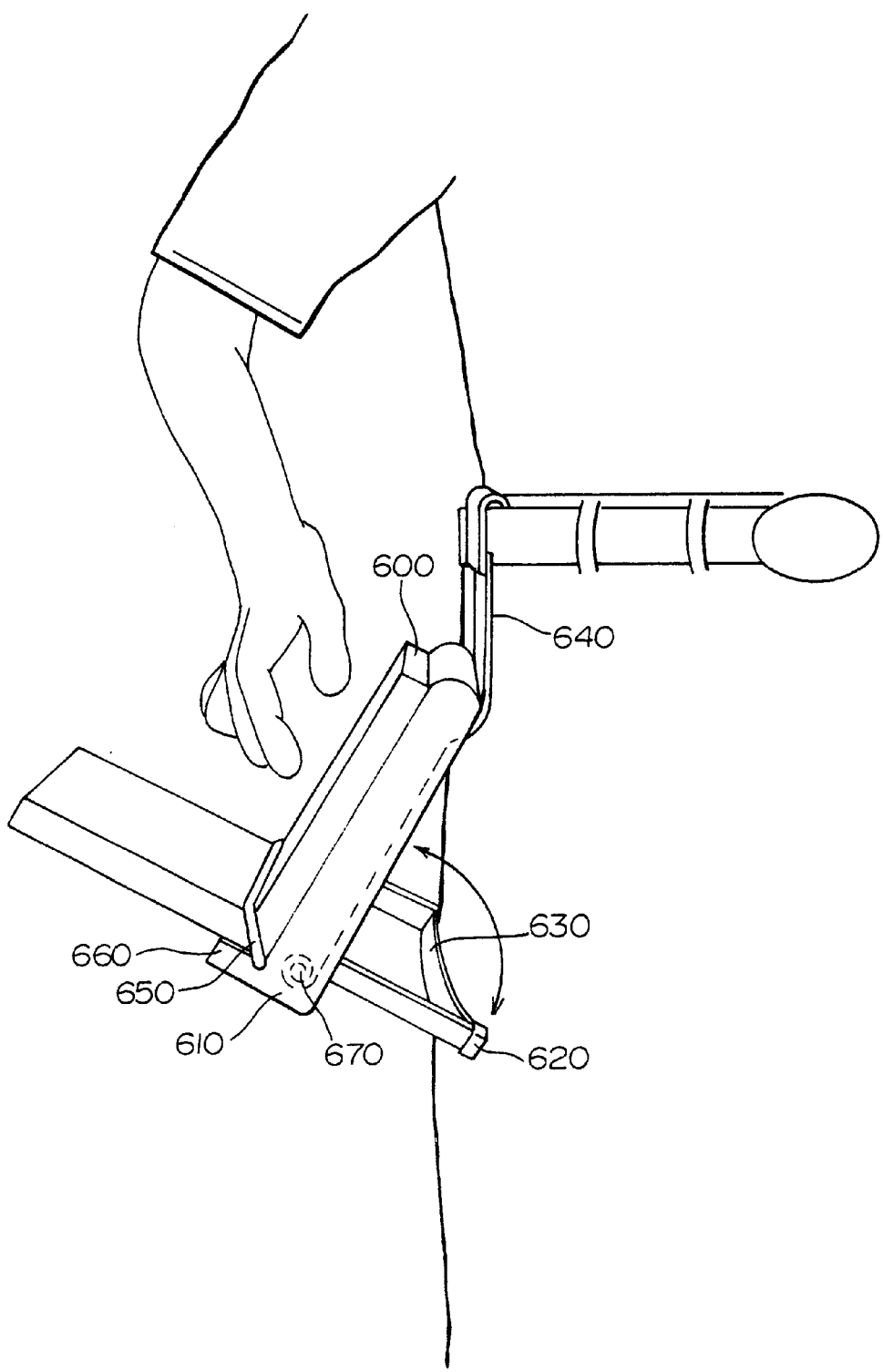
FIG. 6 illustrates an alternative embodiment of the present invention wherein an adjustable platform is used in conjunction with a standard, portable electronic device.

In the previous embodiments, the present invention has been described as an entire unit which incorporates inventive height adjustment strap 108 as a part of electronic device 100. However, the benefits and objectives of this invention are equally realized in a height adjustable support configuration for use with traditional portable devices. FIG. 6 illustrates platform 610 for use with portable device 600. Take-up roller mechanism 670, strap 640, legs 620, and strap 630 all operate the same as similar components described in conjunction with FIGS. 1 through 5. Platform 610 is preferably constructed of lightweight plastic and incorporates ledge 660 and anchor strap 650 to keep device 600 from falling off platform 610. A non-slip surface incorporated into platform 610 also assists with maintaining device's 600 contact with platform 610. Other shapes, sizes and attachment methods for adjustable supports are considered to be within the scope of the present invention.

Conclusion

A system and method has been shown in the above embodiments for the effective implementation of a wearable electronic device with simple and quick height adjustment mechanisms to allow comfortable use by a standing operator. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, leg styles, handle position or composition, locking structures or surface textures.

What is claimed is:

1. A height adjustable electronic device attachable to a user while standing comprising:
    an electronic device housing;
    a retracting mechanism located within said electronic housing;
    a flexible substrate having a first and second end, said first end attached to said retracting mechanism;
    a tensioning mechanism to provide resistance to coiling of said flexible substrate;
    a user attachment mechanism, said flexible substrate second end attached thereto, and
    wherein said electronic device is connected to a user by said user attachment mechanism and the height of said electronic device is adjusted by the coiling and uncoiling of said flexible substrate from said retracting mechanism.

2. A height adjustable electronic device as per claim 1, wherein said tensioning mechanism comprises a plurality of adjustable pressure plates.

3. A height adjustable electronic device as per claim 2, wherein said adjustable pressure plates are user adjustable.

4. A height adjustable electronic device as per claim 1, wherein said flexible substrate is comprised of any of TYVEK®, buckram or non-memory prone plastic materials.

5. A height adjustable electronic device as per claim 1, wherein said flexible substrate further comprises conducting paths encapsulated essentially therein.

6. A height adjustable electronic device as per claim 5, wherein said conducting paths provide electronic communications externally to said electronic housing.

7. A height adjustable electronic device as per claim 1, wherein said electronic housing further comprises one or more support legs.

8. A height adjustable electronic device as per claim 7, wherein said support legs comprise two support legs with a flexible support connector therebetween.

9. A height adjustable electronic device as per claim 7, wherein said support legs are connected with electronic housing by hinges.

10. A height adjustable electronic device as per claim 7, wherein said one or more support legs comprise two support legs with a flexible connector therebetween and said electronic housing includes a recess to receive said two support legs and flexible support connector in a folded non-use position.

11. A height adjustable electronic device as per claim 1, wherein said user attachment mechanism comprises a belt clip.

12. A height adjustable electronic device as per claim 11, wherein said belt clip comprises a polycarbonate material.

13. A height adjustable electronic device as per claim 1, wherein said retracting mechanism comprises at least an elongated cylinder, spring, and retaining element.

14. A height adjustable electronic device as per claim 1, wherein said retracting mechanism comprises at least an elongated cylinder, ratchet and pawl elements.

15. A height adjustable electronic device as per claim 1, wherein said electronic housing further comprises a display area.

16. A height adjustable electronic device as per claim 15, wherein said display area is extended at an angle with respect to said electronic housing.

17. A height adjustable support attachable to a user while standing comprising:
    a support housing;
    a retracting mechanism located within said support housing;
    a flexible substrate having a first and second end, said first end attached to said retracting mechanism;
    a tensioning mechanism to provide resistance to coiling of said flexible substrate;
    a user attachment mechanism, said flexible substrate second end attached thereto, and
    wherein said support is connected to a user by said user attachment mechanism and the height of said support is adjusted by the coiling and uncoiling of said flexible substrate from said retracting mechanism.

18. A height adjustable support as per claim 17, wherein said tensioning mechanism comprises a plurality of adjustable pressure plates.

19. A height adjustable support as per claim 18, wherein said adjustable pressure plates are user adjustable.

20. A height adjustable support as per claim 17, wherein said flexible substrate is comprised of any of TYVEK®, buckram or non-memory prone plastic materials.

21. A height adjustable support as per claim 17, wherein said flexible substrate further comprises conducting paths encapsulated essentially therein.

22. A height adjustable support as per claim 21, wherein said conducting paths provide electronic communications externally to said support housing.

23. A height adjustable support as per claim 17, wherein said support housing further comprises one or more support legs.

24. A height adjustable support as per claim 23, wherein said support legs comprise two support legs with a flexible support connector therebetween.

25. A height adjustable support as per claim 23, wherein said support legs are connected with electronic housing by hinges.

26. A height adjustable support as per claim 23,
wherein said one or more support legs comprise two support legs with a flexible connector therebetween and said support housing includes a recess to receive said two support legs and flexible support connector in a folded non-use position.

27. A height adjustable support as per claim 17,
wherein said user attachment mechanism comprises a belt clip.

28. A height adjustable support as per claim 27,
wherein said belt clip comprises a polycarbonate material.

29. A height adjustable support as per claim 17,
wherein said retracting mechanism comprises at least an elongated cylinder, spring, and retaining element.

30. A height adjustable support as per claim 17,
wherein said retracting mechanism comprises at least an elongated cylinder, ratchet and pawl elements.

31. A height adjustable support as per claim 17,
wherein said support retains an electronic device.

32. A height adjustable support as per claim 31,
wherein said electronic device further comprises a display area.

33. A height adjustable support as per claim 32,
wherein said display area is extended at an angle with respect to said electronic device.

34. A height adjustable support as per claim 17,
wherein said electronic device comprises any of a keyboard, portable computer, data input device.

35. A height adjustable electronic device attachable to a user while standing comprising:

an electronic device housing;

a retracting mechanism located within said electronic housing;

a flexible substrate having a first and second end, said first end attached to said retracting mechanism;

a user attachment mechanism including a belt attachment, said flexible substrate second end attached to said belt attachment, and wherein said electronic device is connected to a user by said user attachment mechanism and the height of said electronic device is adjusted by the coiling and uncoiling of said flexible substrate from said retracting mechanism.

36. A height adjustable support attachable to a user while standing comprising:

a support housing;

a retracting mechanism located within said support housing;

a flexible substrate having a first and second end, said first end attached to said retracting mechanism;

a user attachment mechanism including a belt attachment, said flexible substrate second end attached to said belt attachment, and wherein said support is connected to a user by said user attachment mechanism and the height of said support is adjusted by the coiling and uncoiling of said flexible substrate from said retracting mechanism.

* * * * *